(12) United States Patent
Pittroff (10) Patent No.: US 7,191,938 B2
(45) Date of Patent: Mar. 20, 2007

(54) SYSTEMS AND METHODS FOR ENTERPRISE BASED ISSUANCE OF IDENTIFICATION CARDS

(75) Inventor: Fredrick L. Pittroff, Denver, CO (US)

(73) Assignee: Dynamic Solutions International Corporation, Englewood, CO (US)

( * ) Notice: Subject to any disclaimer, the term of this patent is extended or adjusted under 35 U.S.C. 154(b) by 1087 days.

(21) Appl. No.: 09/748,510

(22) Filed: Dec. 26, 2000

(65) Prior Publication Data

US 2002/0082885 A1 Jun. 27, 2002

(51) Int. Cl.
*G06K 5/00* (2006.01)

(52) U.S. Cl. .................. 235/380; 705/39; 705/705; 705/35

(58) Field of Classification Search ........ 235/380–381; 705/39, 35; 205/381
See application file for complete search history.

(56) References Cited

U.S. PATENT DOCUMENTS

| | | | | |
|---|---|---|---|---|
| 5,266,781 A | * | 11/1993 | Warwick et al. | 235/375 |
| 5,569,897 A | * | 10/1996 | Masuda | 235/379 |
| 5,710,637 A | * | 1/1998 | Matsumoto | 358/400 |
| 5,883,452 A | * | 3/1999 | Masuda | 235/380 |
| 5,940,811 A | * | 8/1999 | Norris | 705/38 |
| 6,134,614 A | * | 10/2000 | Chari et al. | 710/302 |
| 6,144,948 A | * | 11/2000 | Walker et al. | 705/38 |
| 6,335,799 B1 | * | 1/2002 | Provost | 358/1.4 |
| 6,877,656 B1 | * | 4/2005 | Jaros et al. | 235/380 |
| 2005/0236473 A1 | * | 10/2005 | Lenz et al. | 235/380 |

FOREIGN PATENT DOCUMENTS

JP 2001014515 A * 1/2001

OTHER PUBLICATIONS

"spool", Microsoft Computer Dictionary 3rd Edition, Microsoft Press, 1997, p. 446.*
Sales brochure entitled: "MCAT: MAG-TEK Card Activating Terminal"; 1995; p. 1-6.
Sales brochure entitled: "HI-CO MCAT: Virtually Unerasable Bank Card Encoding . . . "; p. 1-2.

* cited by examiner

Primary Examiner—Ella Colbert
Assistant Examiner—James M. Alpert
(74) Attorney, Agent, or Firm—Townsend and Townsend and Crew LLP (57) ABSTRACT

Methods and associated systems for enterprise-wide issuance of identification cards. A single enterprise server component and a plurality of card issuance machine controller components are distributed over an enterprise network. Each card machine controller component controls one or more devices for the production of identification cards including, for example, embossed and/or digitally encoded information. The single enterprise server component acts as a server to route the card issuance requests to the proper card machine controller component on behalf of client programs at each location used to request the production of an identification card. The enterprise server component further provides enhanced security and encryption to provide requisite security in the exchange of sensitive information in the production of such identification cards. An administrative component, which can be used anywhere on the network, provides centralized management of common data used by the server, card machine controllers and client programs in the production of identification cards. The administrative component also provides for centralized administration of the plurality of PCs, card issuance machines and software components to permit easy re-assignment of future production requests for purposes of management and/or for end user convenience.

3 Claims, 11 Drawing Sheets

SYSTEMS AND METHODS FOR ENTERPRISE BASED ISSUANCE OF IDENTIFICATION CARDS

BACKGROUND OF THE INVENTION

1. Field of the Invention

The invention relates to production and issuance of embossed and/or encoded identification cards and more specifically relates to an enterprise-wide system for providing centralized control and management for issuance of such identification cards.

2. Discussion of Related Art

Issuance of identification cards is a critical task in many commercial and other endeavors. Exemplary of such endeavors are credit card issuance, debit card issuance, frequent customer identification card issuance, security card issuance, etc. Such identification cards often include embossed identification information and or digitally encoded identification information. Such digitally encoded identification information may be recorded on the identification card in a magnetic stripe or other storage medium as well as in so-called "smartcard" chips embedded within the identification card.

Generation of such identification cards has long been the exclusive domain of complex, costly, large devices capable of both embossing the cards as well as programming digital identification information. In more recent years, devices for issuance of such identification cards have dramatically fallen in price as well as shrunken in physical size ("footprint"). For example, the model 150i embossing and encoding machine produced by DataCard Corp. of Minneapolis is a relatively low-cost device having a relatively small footprint (i.e., tabletop or desktop configuration). The DataCard 150i embossing and encoding machine is capable of producing such cards under control of an externally attached computing system such as a personal computer ("PC").

Although older, larger devices were capable of producing much higher volumes of identification cards, the low-cost and small footprint of the DataCard 150i makes it possible to distribute such functions into more convenient localized facilities. Localized issuance of such identification cards is often referred to in the industry as "instant issuance." The paradigm of instant issuance allows for an identification card to be made while the user or customer waits rather than waiting days or weeks for a centralized facility to produce such card and ship the produced card to the end user.

Although devices such as the DataCard 150i enable the decentralized issuance of identification cards, computing systems to permit such decentralized issuance of cards while maintaining centralized control of the information embossed and/or encoded on such cards were not available.

The computing system called CardWizard® was produced and marketed by Dynamic Solutions International of Colorado in 1997. This computing system is comprised of a collection of interrelated software components designed to work in a distributed client/server model within a single location. Although designed in accordance with a single location client/server software model, when applied to a broader multi-location enterprise environment, a number of problems arise in this and other current solutions.

1. Financial identification cards require usage of highly sensitive data used for encryption calculations that produce values that are embossed and encoded on identification cards. This data is referred to as "encryption keys." To simplify software installation and provide greater security, large banking and other large financial enterprises prefer these encryption keys be stored at a single secured location within the network rather than at each location that has a card issuance machine. The original version of CardWizard®, like other present solutions, required these encryption keys to be stored at each location that had a card issuance machine.
2. Administration and management problems arise where an enterprise may have different capabilities at each of several decentralized locations. For example, a large financial institution may issue ATM cards in one location and debit cards in a different location. It is therefore important for enterprise solutions to be easily configured, administered and managed to permit production of identification cards to be performed at a most appropriate location.
3. Problems arise when decentralized locations, which cannot afford the cost of an issuance machine, wish to issue cards on an issuance machine located at another location within the network.
4. Problems arise when locations want card production requests stored in a queue that allows cards to be produced at a later time at either their location or another location within the enterprise.
5. Only a single card issuance machine is supported on a single PC.
6. Support of external software processes in lieu of card issuance machines was not available. For example, rather than producing the card immediately at a card machine, it may be desired to route the card information to another computer system on the network for some other type of processing.
7. Administration of card issuance machines, users, system access and production reporting and management of system options had to be done at each location rather than centrally.
8. There are duplicate databases throughout the network, which increases exposure to fraudulent activities and required more systems administration activities to synchronize or replicate updated information.
9. Having "self contained" card issuance systems at a single location presents the risk of someone stealing the equipment and potentially using it to make illegal financial cards.

It is evident from the above discussion that a need exists for improved enterprise coordination in the production and issuance of embossed and/or encoded identification cards in a decentralized manner.

SUMMARY OF THE INVENTION

The present invention solves the above and other problems, thereby advancing the state of the useful arts, by providing improved administration and management of decentralized identification card issuance in an enterprise-wide environment. In particular, the present invention includes features for using and managing multiple identification card production machines distributed throughout the enterprise and for routing of production requests for identification cards anywhere in the enterprise network.

More specifically, a card machine controller component ("CMC") resides within a PC on the enterprise network and acts as a server at its physical location for connecting various configurations of card issuance machines and/or external software processes. Card issuance machines include devices such as the DataCard 150i while external software processes include tasks such as writing card information to a disk file or sending card information to another software application within the enterprise network. Multiple such card machine controller server components may reside in PCs dispersed throughout the enterprise network. The card issuance machine controller component communicates with client processes within the enterprise for purposes of producing identification cards at that location.

As used herein, card issuance components includes card issuance machines such as DataCard products as well as other devices for creating identification cards and further includes external software processes for application specific custom software modules to create identification cards outside the scope of a particular machine. Further, as used herein, card issuance controller and CMC refer to a control module of the present invention that controls low level operations of one or more card issuance components.

An administration component of the present invention interfaces with the single enterprise server component to coordinate access to centralized information required in production of cards and to permit enhanced management of the distribution of card production requests to appropriate card issuance machines in the enterprise.

An aspect of the present invention enables a user-friendly graphical user interface to manage the definition of the entire enterprise's card production network. This definition includes configuration of each decentralized location including, but not limited to, the users, PCs, card issuance machines, which types of cards are allowed to be produced by a location and/or user and where each type of card will be produced. The graphical user interface ("GUI") allows an administrator to change the configuration as needed. For example, if it is desired to have future production of a type of card at a different card issuance machine, the administrator can use a simple drag and drop operation to effectuate this change.

Another aspect of the present invention enables a user-friendly graphical user interface to manage the assignment and re-assignment of pending card production requests to appropriate card issuance machines distributed in the enterprise. The GUI allows an administrator to drag and drop card issuance requests presently assigned to a first card issuance machine to a different machine. This feature simplifies the management of the enterprise-wide production of identification cards by permitting the administrator to re-assign a production request to another issuance machine. For example, if a first issuance machine becomes inaccessible due to failure or is otherwise overloaded with requests, another machine at the same location or at another convenient location may be assigned the task of producing a queue of such requested cards.

A still further aspect of the present invention lies in centralized security for the decentralized card issuance machines of the enterprise. A central administration component provides a central point of control for security including user ID's and related password protection for use of the card issuance machines and encryption of sensitive information exchanged between the enterprise server component and the distributed card machine controller components.

The above, and other features, aspects and advantages of the present invention will become apparent from the following descriptions and attached drawings.

DETAILED DESCRIPTION OF THE PREFERRED EMBODIMENTS

While the invention is susceptible to various modifications and alternative forms, specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

Figure 1:
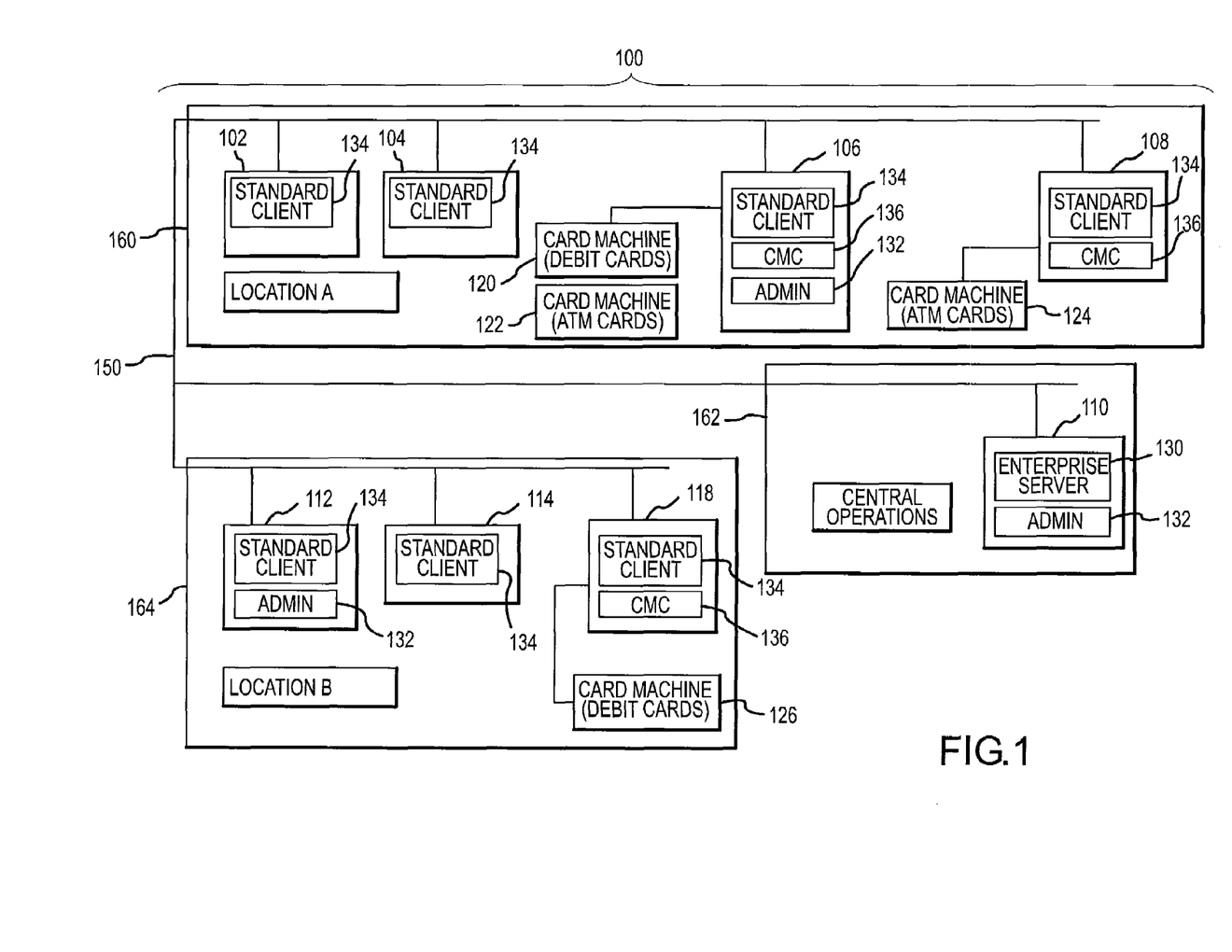
FIG. 1 is a network diagram showing a sample enterprise configuration of the present invention. The diagram shows physical devices such as PCs and card issuance machines in addition to the various software components installed within each PC.

FIG. 1 is a block diagram of a system 100 in accordance with the present invention. System 100 depicts a number of exemplary elements of the enterprise card issuance system of the present invention. Those skilled in the art will recognize a wide variety of equivalent configurations and topologies in which the present invention may be advantageously applied. Specifically, the present invention accommodates a scaleable enterprise network utilizing client/server programming techniques well known to those skilled in the art. In such client/server programming paradigms, client processes and associated server processes may be co-resident within particular computing devices or may be widely distributed among a variety of computing devices of the enterprise communicating via a network communications medium and protocol. As shown in FIG. 1, all elements preferably communicate via TCP/IP communications network 150.

Within the present invention PCs are defined as members of "PC Groups". Normally a PC group consists of PCs residing at the same physical location. However, a PC group may consist of PCs located at different physical locations. In FIG. 1, there are three PC groups defined—"Central Operations" 162, "Location A" 160 and "Location B" 164.

Enterprise server software component 130 residing in PC 110 at Central Operations location 162 provides centralized management and control for administration of system 100 in accordance with the present invention. The management and administration services provided by enterprise server 130 are accessed by administrative client 132 operable in PC 106, PC 110 and PC 112 in the various locations 160, 162 and 164, respectively. More specifically, administrator software component 132 provides a graphical user interface client process for an administrative user to centrally control, configure, and manage system 100.

PCs 102 through 108 and PCs 112 through 116 generally provide a client process interface 134 for on-site requests for issuance of identification cards. PCs 106, 108 and 116 further provide a direct interface to card issuance machines 120 through 126. The interface to such card issuance machines 120 through 126 is provided by card machine controller component 136 operable within PCs 106, 108 and 116.

As noted above, those skilled in the art will recognize that the specific topology and configuration of system 100 in FIG. 1 is intended merely as exemplary of any number of similar enterprise configurations. In particular, any number of PCs may be assigned to a particular PC group and any number of PC groups may be defined in the enterprise. The preferred physical locations of PCs is simply that which is convenient and beneficial for the enterprise and its customers. Similarly, the physical locations of card issuance machines 120 through 126 is that which is convenient for issuance of cards by the enterprise organization and further convenient for the enterprise customers.

Figure 2:
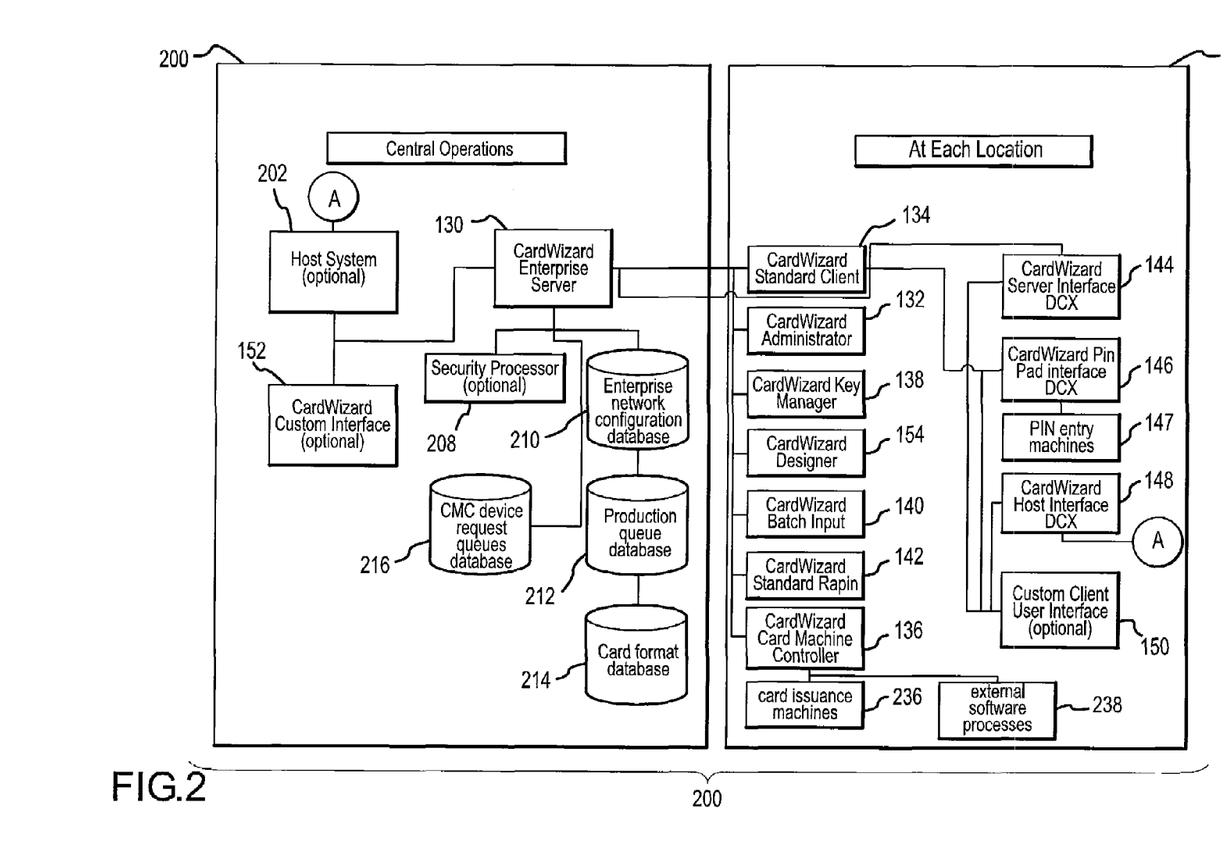
FIG. 2 is block diagram showing the various software components in an enterprise card issuance environment using the present invention. The diagram shows communication paths between the various components.

FIG. 1 also indicates that each of card machines 120 through 126 may be designated for production of a particular type of identification card. For example, in a financial or banking enterprise application, particular card issuance machines may be designated for issuance of ATM cards while other card issuance machines may be designated for issuance of ATM or debit cards. Card issuance machine 120 is designated in the exemplary enterprise of FIG. 1 as primarily a debit card issuance machine while card issuance machines 122, 124 and 126 are designated as primarily ATM card issuance machines. As above, the particular designation of each machine and its physical locations in the enterprise is that which is convenient and useful for the enterprise and its customers. Administrative, management and configuration functions provided by enterprise server software component 130 on PC 110 permit such flexibility in the location and designation of devices distributed in the enterprise.

Where FIG. 1 shows the overall architecture of an exemplary topology of an enterprise, FIG. 2 is a block diagram showing the functional relationship among all elements and processes operable within an enterprise exemplified in FIG. 1. An optional custom interface software component 152 is generally operable in conjunction with host system 202 and is preferably physically co-resident with enterprise server software component 130 in a physical location 200 designated as the central operations location. Remote locations are shown an exemplary single remote location 220 on FIG. 2.

Optional security processor hardware element 208 operates in conjunction with enterprise server software component 130 to provide requisite storage of a financial institution's encryption keys and the encryption/decryption processes required by the enterprise server 130. Encryption keys and related encryption rules can be maintained by an administrative user using the key manager element 138. These encryption keys and encryption rules are stored in either the optional security processor 208 or the card format database 214.

The network configuration database 210 contains information used by the enterprise server software component 130 for management of the network and routing of card production requests to the proper card issuance device 236 at a remote location 220 in the network.

The card format database 214 contains definitions of various types of identification cards (also referred to herein as "card type" or "card type information" or "card format") available for production within the enterprise. Each production request includes a corresponding card type indicating the type of card for which the information is to be produced. Each definition provides the rules and specifications for embossing and encoding the card. These rules are created and maintained by the designer component 154 and utilized by the enterprise server component 130 during the fulfillment of production requests submitted by client components 134, 140, 142 and 150. In particular, standard client component 134 submits requests to produce a particular format of card. Such requests are produced by a user filling in a form on a PC in a remote location. Batch input client 140 generates a batch of card requests from a prepared file or database. Repin component 142 generates requests to change a personal identification number ("PIN") on a previously issued identification card. Such requests are typically processed at a special terminal device designed for the purpose of changing the PIN encoding on the card.

The CMC device "request queues" database 216 contains a collection of queues for each defined device assigned to the card machine controllers in the enterprise. These queues provide temporary storage of card production requests received from client components 134, 140, 142 and 150 that are directed to a specific card issuance machine 236 or external software process 238.

Optional production queue database 212 contains information used by the enterprise server software component 130 for temporary storage of card production requests received from client components 134, 140, 142 and 150 that are directed to a specific production queue. Requests held in this production queue database 212 are not produced until requested by a user using the Administrator software component 224 at a remote location 220. At that time, the card will be produced at a card issuance device 236 attached to a CMC software component 136 located at a remote location 220 specified in the network configuration database 210.

These centralized host based elements communicate via standard TCP/IP communications media and protocols with elements physically resident at each location 220. A typical location 220 optionally may include a number of custom client user interface elements 150 and/or standard client user interface elements 134, 140 and 142. Client user interface elements 150, 134, 140 and 142 provide the graphical user interface for customers and or enterprise customer service representatives to generate and enter requests for production or repinning of identification cards. Such requests by client user interface elements 150, 134, 140 and 142 are directed via the network to enterprise server 130 typically resident in the central operations location 200.

In addition to client user interface elements 150, 134, 140 and 142, elements 224, 226 and 154 represent other standard interface elements provided at a remote location 220. Such standard elements may include components for administrative functions such as user maintenance, reporting and card stock inventory management (element 224); administration of a financial encryption keys (element 226); and design of specific card formats to be produced by the system (element 154).

For example, a particular location may design a new style or format of identification card, may issue requests for batches of identification cards to be produced, and may administer particular aspects of identification information and security information useful to service representatives at the particular remote location 220 as well as useful to particular customers at that location. Such local management requests are also directed to enterprise server 130 through standard network communications.

Though not required, a particular remote location 220 may provide a number of local card issuance machines 226 or external software processes 238. Such card issuance machines and external software processes are interfaced by a card machine controller (CMC) software component 136.

Each CMC software component interfaces one or more appropriate card issuance devices or external software processes.

A client user interface element 134, 140, 142 or 150 generates a request at a remote location 220 for issuance of a particular type of identification card. The request is forwarded to the enterprise server 130 located at a physical central operations location 200. The request is communicated via standard network communication media and protocols, preferably TCP/IP network protocols and associated network communication media. Information required for production of the requested identification card may be obtained locally by the client user interface element 134, 140, 142 or 150 as well as centrally provided by operation of the enterprise server 130. For example, details of the particular customer or account information for the particular customer is preferably centrally stored at the central operations location and accessed in a controlled manner through the optional Custom Interface software component 152. Any sensitive or confidential information transferred between the enterprise server 130 and client user interface elements 134, 140, 142 and 150 and card machine controller element 136 is preferably encrypted to maintain security through the network. If the card is to be issued, the information necessary to emboss and/or encode the card is generated using the card format database 214.

Card format database 214 contains definitions for each type of card known to the enterprise for production. This definition includes placement of information on a card, style of production of the information (i.e., encoded and/or embossing), application specific information (i.e., financial calculations relating to banking etc.), type of card stock/media (i.e., plastic embossed cards, magnetic stripes, "smart" cards, etc.) and other information required to generate any particular type of card used in the enterprise.

Using the network configuration database 210 the enterprise server determines which card machine controller component and which card issuance device or external software process to use for the request. The information is then encrypted and transferred from the enterprise server 130 to the appropriate CMC software component 136 in the enterprise. The card machine controller component 136 then communicates with the appropriate card issuance device 236 or external software process 238 to produce the card. Optionally, the information communicated to the card issuance device or external software process may also be encrypted for additional security.

The server interface element 144 allows custom client user interfaces 150 to easily communicate with the enterprise server component 130 by providing a standard programming interface. The PIN pad interface OCX element 146 provides a standard programming interface between client components 134 and 150 and PIN entry machines 147. These PIN entry machines allow a customer to select their current PIN and optionally select a new PIN. The host interface OCX component 148 provides a standard programming interface between the custom client user interface 150 and the host system 202. This interface allows simplified transmission of information between the two elements.

As noted above, those skilled in the art will recognize that the functional decomposition of elements and the physical locations of such elements as shown in FIG. 2 is intended merely as exemplary of one preferred embodiment. The client/server programming paradigm permits the various client processes and server processes to be distributed anywhere in the enterprise network. Further, the specific breakdown of components may differ depending on specific design choices in implementing the features of the present invention.

Figure 3A:
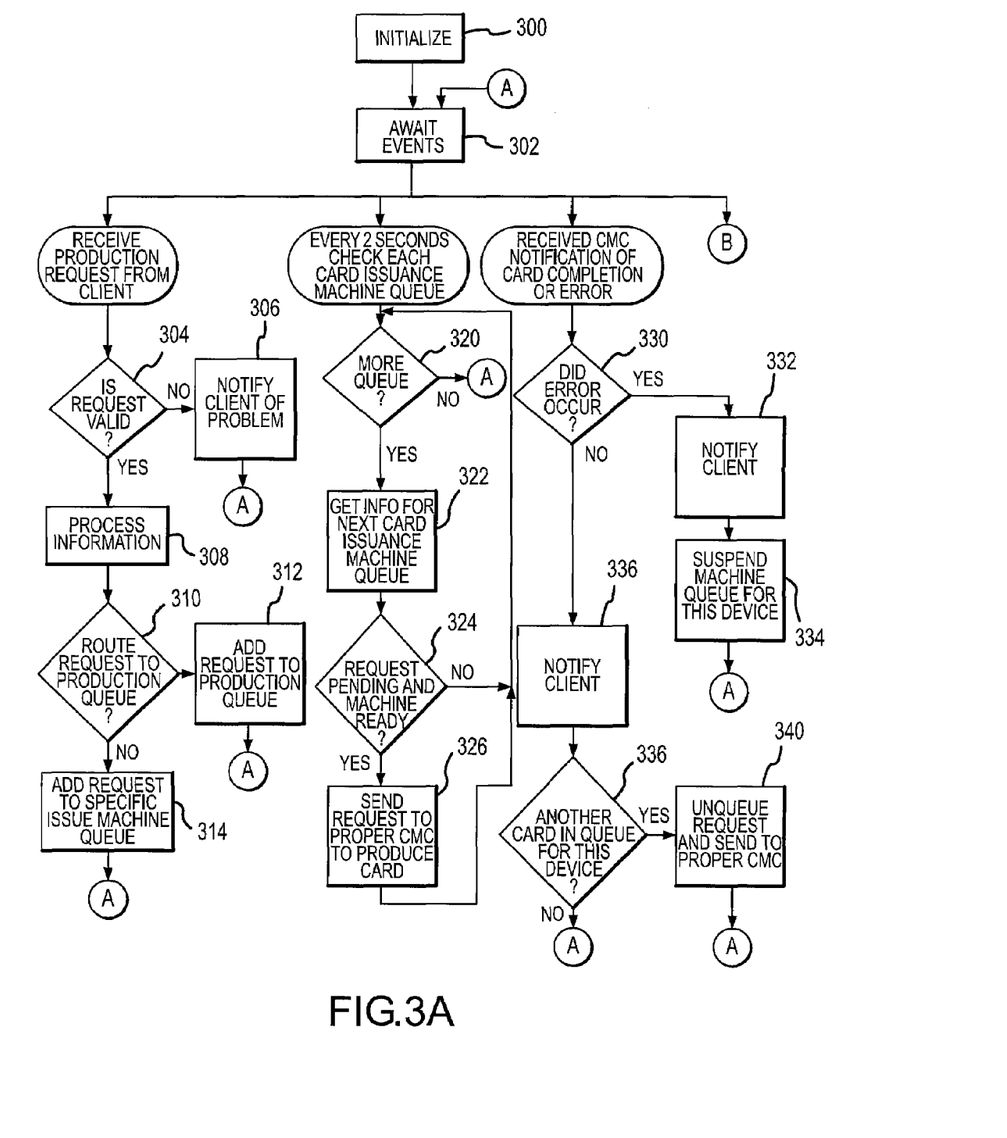
FIG. 3 is a software flowchart of the operation for the enterprise server component for the present invention.
Figure 3B:
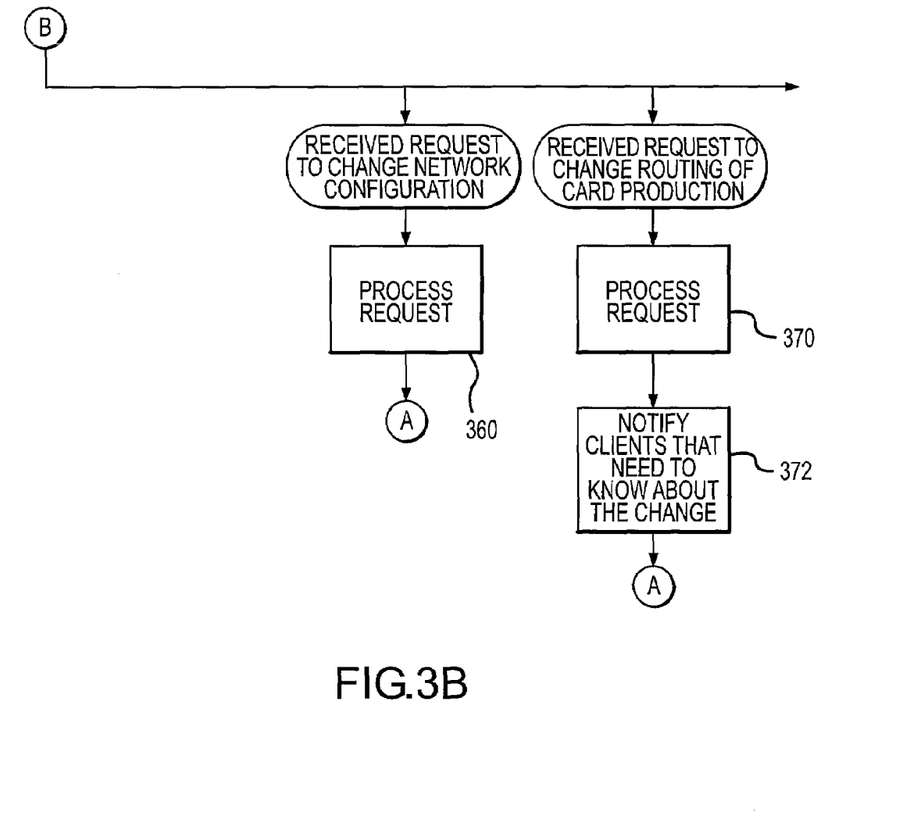

FIG. 3 is a flowchart describing the operation of the enterprise server element depicted above FIGS. 1 and 2. In general, the enterprise server process initializes when it commences operation and then awaits receipt of an event message indicative of an operation requested by a client process within the enterprise or from the enterprise server's internal clock timer. Requests are directed to the enterprise server from client user interface processes for production of cards and card machine controller elements as well as from the client administrative user interface for reconfiguration or other management operations of the present invention.

Element 300 represents processing to initialize operation of the enterprise server. Among other functions, the initialization processing includes discovery and initialization of card machine controller components in the network. Asynchronously, each card machine controller initializes each of the issuance machines or external software processes it is designated to control. Further details of such initialization processing are provided herein below with respect to FIG. 4.

In the preferred embodiment, the server process awaits receipt of event messages from card machine controller processes with card production completion notifications and client processes requesting services from the enterprise server process. In addition, every two seconds, or other time interval so established, a timer event occurs and the server process checks each issuance machine queue to see if a card request needs to be processed. Element 302 therefore represents processing by the enterprise server process to await receipt of a supported timer event or a client initiated event message. Upon receipt of such an event, the method then continues by processing the received event in accordance with a type indicated therein. Exemplary of such client event messages in the preferred embodiment are: a client request to produce an identification card, an indication that production of a requested identification card has completed, an administrative user client request to associate a newly designed card format with a particular issuance machine or its associated queue, and a request to administer, configure or manage the card issuance enterprise system of the present invention.

Those skilled in the art will recognize that the particular events to be processed by the enterprise server are a matter of design choice in the implementation of the present invention. The particular events depicted in FIG. 3 are therefore intended merely as exemplary of typical events that may be processed by enterprise server operable in accordance with the present invention. Furthermore, those skilled in the art will recognize a variety of other programming paradigms useful in implementing features of the enterprise server. An event driven model as described herein with respect to FIG. 3 is therefore intended as representative of all such solutions.

In response to a request to produce an identification card, elements 304 through 314 are operable to process the request. Element 304 first checks the request to make sure all required information is provided (i.e., the request is valid). If the request is not valid element 306 is operable to notify the originating client of the problem and processing loops back to element 302 to await a next event. If the request is valid, element 308 next performs any requisite processing to calculate or reformat information for the card to be produced. For example, in financial applications of the present invention, ATM or credit cards have calculations involving customer PIN selection or assignment. Element 310 is next operable to determine whether the request is to be placed on a production queue for later processing or is to be routed to a queue associated with a card machine or external software process for processing. If routed to a production queue, element 312 is operable to queue the request on an identified production queue for later processing. If the request is to be processed now, element 314 routes the request to the queue of the identified card machine or external software process. In both cases, processing loops back to element 302 to await a next event.

Every two seconds, element 320 checks to see if more issuance machine queues need be checked. If all issuance machine queues have been checked processing completes for this timed event and continues at element 302 (label A) to await occurrence of another event. If more queues remain to be checked, element 322 gets information for the next card issuance machine queue. Element 324 then determines whether the card issuance machine or external software process associated with the queue or otherwise identified by the request is presently busy servicing other requests. If the machine or process is busy, processing continues by looping back to element 320 to check additional issuance machine queues. If the machine or process is not busy, processing continues with element 326 to unqueue the next request queued for the identified card issuance machine and transmit the unqueued request to an appropriate card machine controller responsible for controlling operation of the identified card issuance machine. Processing then continues by looping back to element 320 to determine if more queues remain to be processed.

Processing by the card issuance machine proceeds asynchronously with respect to the enterprise server. Completion of the card production request will be signaled to the enterprise server by a subsequent event message as discussed below.

In response to receipt of an event message signifying completion of an identification card production request, element 330 is operable to determine if the card was completed or an error occurred. If completed without errors, the client process that submitted the original request is notified of the completion with element 336 and then element 338 is operable to determine whether additional requests remain queued for the card issuance machine identified in the completion event message. If so, processing continues at element 340 to unqueue a next production request and transmit the request to the identified card machine controller and then loop back to element 302 (label A) to await receipt of the next event. If no further requests are presently queued for the identified card machine, processing continues by looping back to element 302 (label A).

If element 330 determines that an error occurred in processing a request, element 332 is operable to notify the originating client process of the error. Element 334 then suspends processing of further requests for this queue until the problem is corrected by an operator. Processing then continue by looping back to element 302 (label A) to await receipt of another event.

In response to receipt of an administrative reconfiguration or management event message, element 360 is operable to reconfigure the enterprise card issuance system in accordance with parameters supplied in event message. As noted elsewhere herein, an administrative user of the enterprise server may reconfigure the system to associate particular PCs with particular PC Groups, to associate particular card issuance machines with particular PC Groups and PCs, to associate particular card formats with particular card issuance machines, etc. Processing then continues by looping back to element to 302 (label A) to await receipt of another event message.

In response to receipt of an event message requesting a change in the routing of future card requests from one card issuance machine to another, element 370 is operable to so make this change. Element 372 then notifies the appropriate affected clients of the routing change. Processing then continues at element 302 (label A) as described above. Such a request may be initiated by an administrative client process in response to graphical input to "drag and drop" of selected routing definitions.

Figure 4:
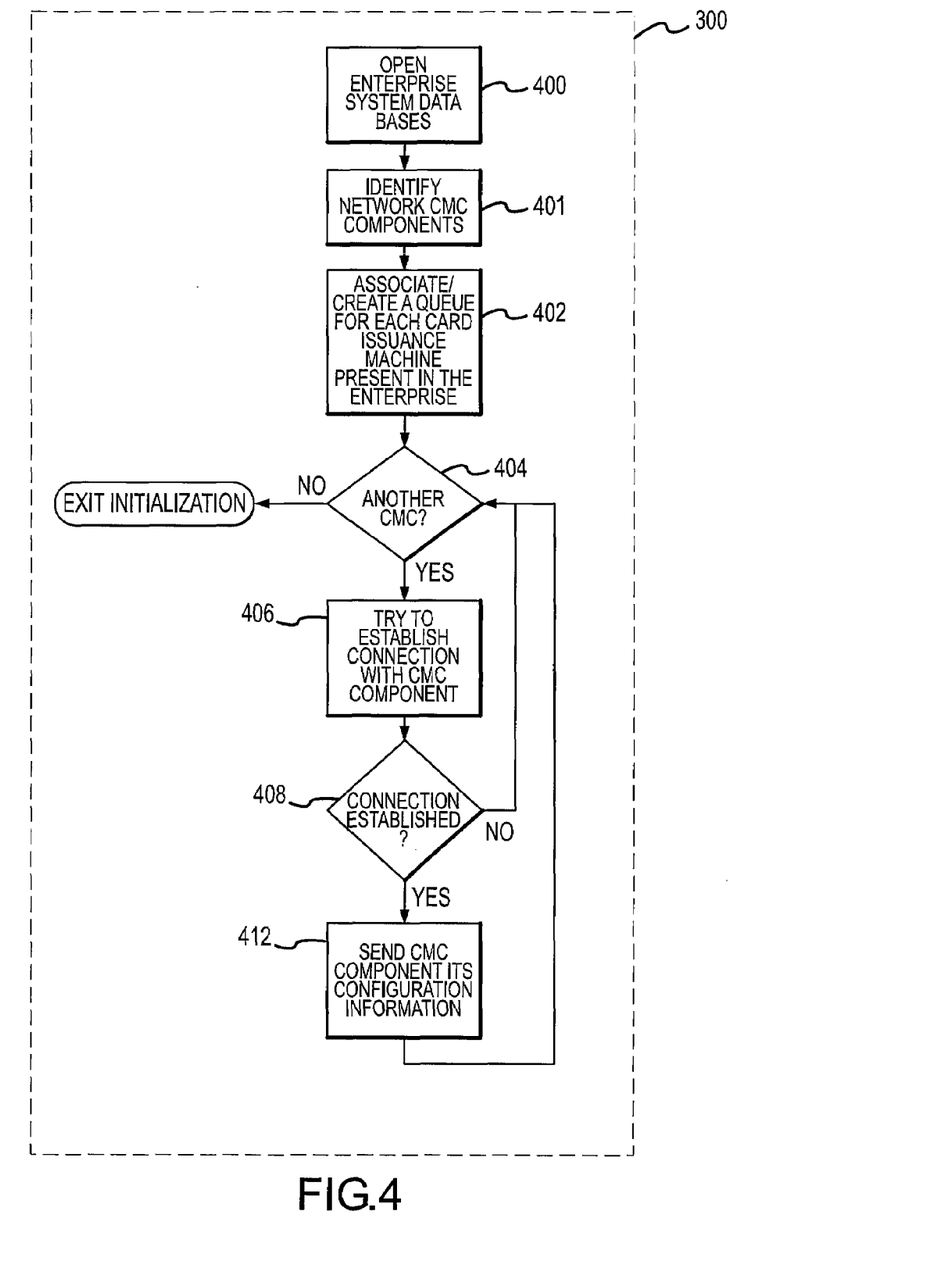
FIG. 4 is a software flowchart showing the enterprise server component's initialization logic.

FIG. 4 is a flowchart describing additional details of the processing of element 300 to initialize the enterprise card issuance system of the present invention. Element 400 is first operable to open all system databases. Element 401 then identifies all card issuance machine controller elements present in the enterprise as defined in the system database (210 of FIG. 2). As noted above, a card issuance machine controller element is operable within a PC in locations that physically include card issuance machines. The card issuance machine controller element is a module operable in a PC at such a location to manage the production operations of one or more card issuance machines. The identity and location of all such card issuance machine controllers is used by the enterprise server to prepare its initial configuration information.

Element 402 then creates a queue associated with each card issuance machine present in the enterprise system. Element 404 then determines whether all CMC components in the enterprise have been processed by elements 406 through 412. If no further CMC components remain to be processed, processing of element 300 is complete. If more CMC components are to be processed, element 406 is operable with respect to the next CMC component to attempt to establish a connection therewith. Element 408 then determines whether the attempted connection was successful. If not, processing of this CMC component is complete and processing loops back to element 404 to process additional CMCs. If the connection attempt succeeds, element 412 transmits configuration information from the network configuration database (210 on FIG. 2) to the CMC component (136 on FIG. 1). This configuration information informs the CMC component of the types of card issuance machines attached to, or external software processes associated with the CMC component and the interfaces to be used (i.e., the physical and logical configuration of the CMC component and its card issuance machines and external software processes, elements 236 and 238 respectively.) Processing then loops back to element 404 to process remaining CMC components.

Those skilled in the art will recognize that the flowcharts of FIGS. 3 and 4 are intended merely as representative of one exemplary embodiment of the enterprise server system of the present invention. A number of equivalent alternate embodiments will be readily apparent to those skilled in the art. Such design choices in implementation are well known to those of ordinary skill in the art.

FIGS. 5 through 10 are exemplary screen images depicting typical user interface techniques for implementation of the enterprise card issuance system of the present invention. In particular, these screen images are representative of screens typically used by an administrative user to configure and manage the enterprise card issuance system of the present invention.

Figure 5:
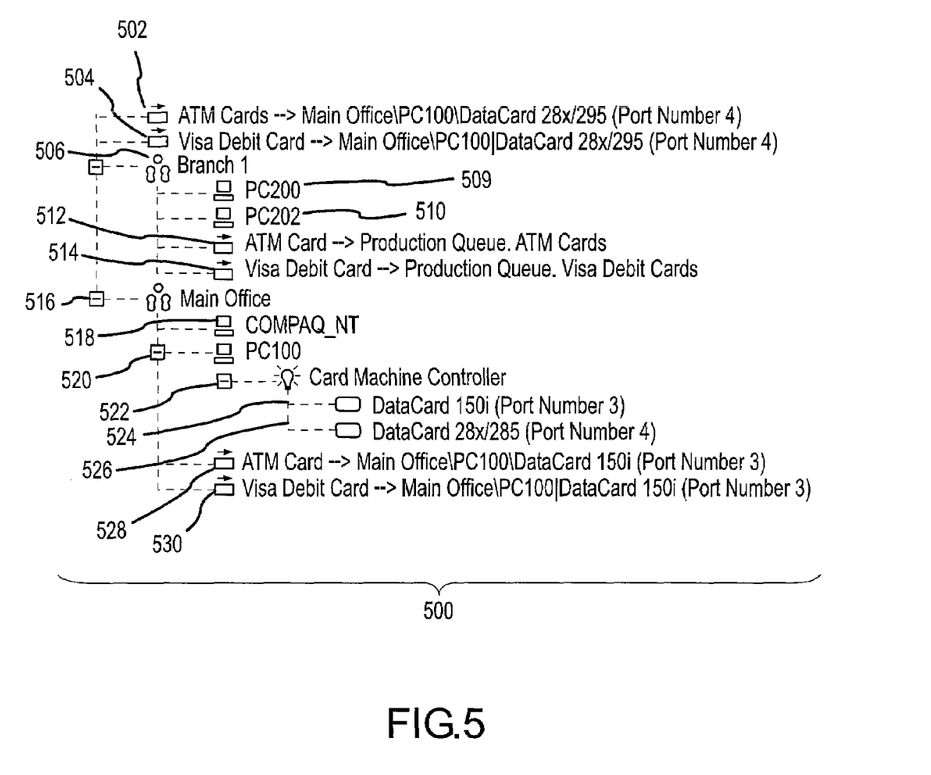
FIGS. 5 through 10 are exemplary graphical user interface display screens used in conjunction with the methods and structures of the present invention.

FIG. 5 depicts elements and resources available in a typical enterprise system in accordance with the present invention. In FIG. 5, the first two elements 502 and 504 identify production queues in which requests for associated types of cards are queued awaiting production by an assigned card issuance machine. In particular, the first queue 502 named "ATM Cards" is assigned to a card issuance machine named "Main Office\PC100\DataCard 28x/295." A second queue 504 named "Visa Debit Cards" is assigned to the same card issuance machine named "MainOffice\PC100\DataCard 28x/295." A PC group 506 named "Branch 1" has two PCs 508 and 510 associated therewith and named "PC200" and "PC202." The PC group 506 does not have a card issuance machine. Two card formats 512 and 514 named "ATM Card" and "Visa Debit Card", are associated ("linked") with requests generated by clients operating on all PCs of "Branch 1." All requests submitted for production of "ATM Card" card formats will be stored in the system production queue 502 named "ATM Cards." Similarly, all requests submitted for production of "Visa Debit Cards" will be stored in the system production queue 504 named "Visa Debit Cards." At some future time, an administrative user can instruct the system to produce the cards being stored in these production queues. In this example, both types of cards will be produced at the DataCard 28x/295 card issuance machine located in the Main Office as discussed below (i.e., the card issuance machine to which the production queue is currently linked).

FIG. 5 also identifies resources in a Main Office 516 including two PCs: element 520, named "PC100" and element 518 named "COMPAQ_NT." Operable within PC 520 ("PC100") is a card machine controller 522 for controlling two card issuance machines, a DataCard 150i card issuance machine element 524 and a DataCard 28x/295 card issuance machine, element 526. Two card formats 528 and 530, named "ATM Card" and "Visa Debit Card", respectively, are associated with PC Group 516 named "Main Office" for production on the attached DataCard 150i card issuance machine 524.

The various elements of the enterprise are shown in a "tree" structure to reflect the physical and logical relationships among the elements. The physical relationships are the physical proximity of the elements. In other words, PCs that are members of the PC group "Main Office" are shown under the branches of the tree display rooted at element 516 "Main Office". In addition to PCs defined within each PC group are routing directives ("links") for the various card formats at either the PC group or PC level. These links specify either a particular card issuance machine or a specific production queue.

Production queues, elements 502 and 504, are available for the entire enterprise and are linked, similar to how card formats are linked, to specific card issuance machines. However, card requests in the production queues are not produced until so directed by an administrative user at a later time. At that time, all card requests in the specified production queue will be produced at the currently linked card issuance machine.

Card format and production queue links are logical relationships that the administrative user can create and modify using simple drag and drop manipulations on the displayed graphical tree structure. For example, in order to create a new card format link and associate it with a card issuance machine queue an administrative user would perform the following exemplary steps on the graphical user interface shown in the following figures.

Figure 6:
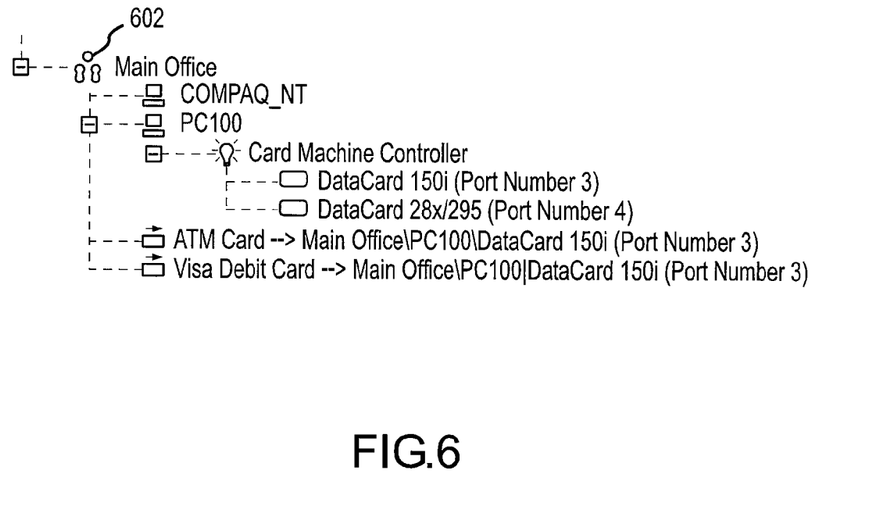
Figure 7:
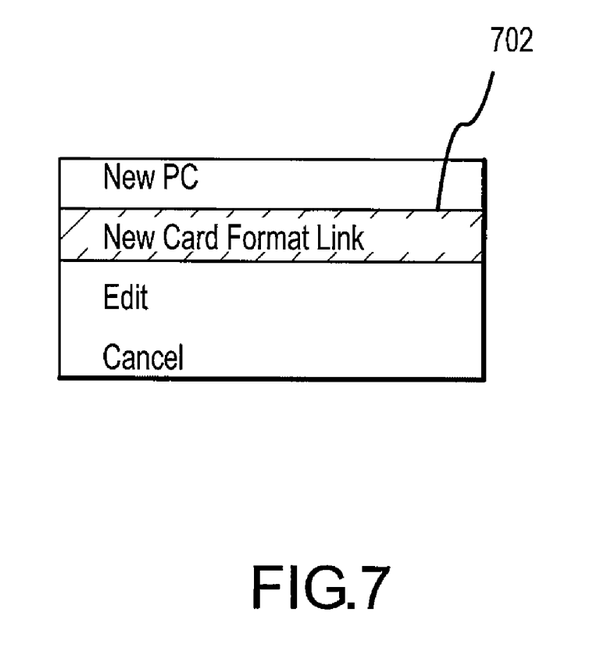
Figure 8:
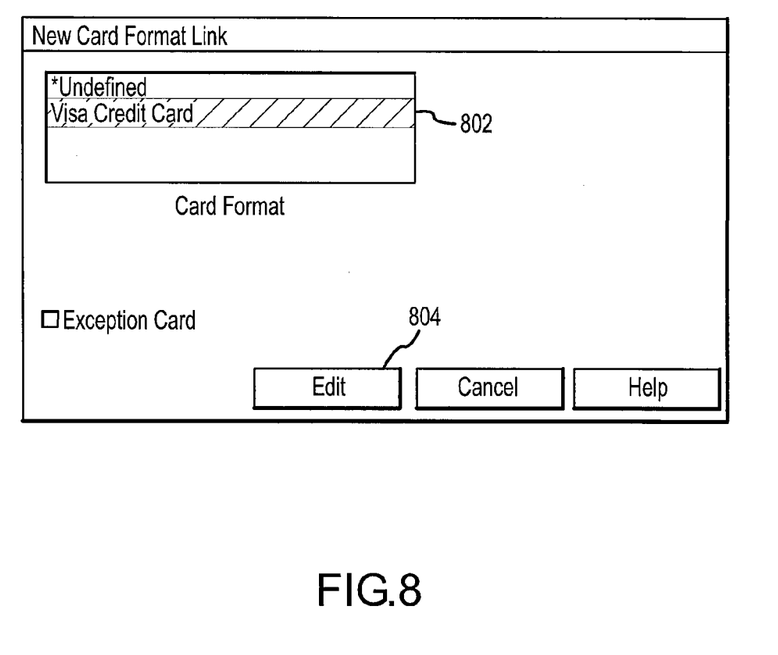
Figure 9:
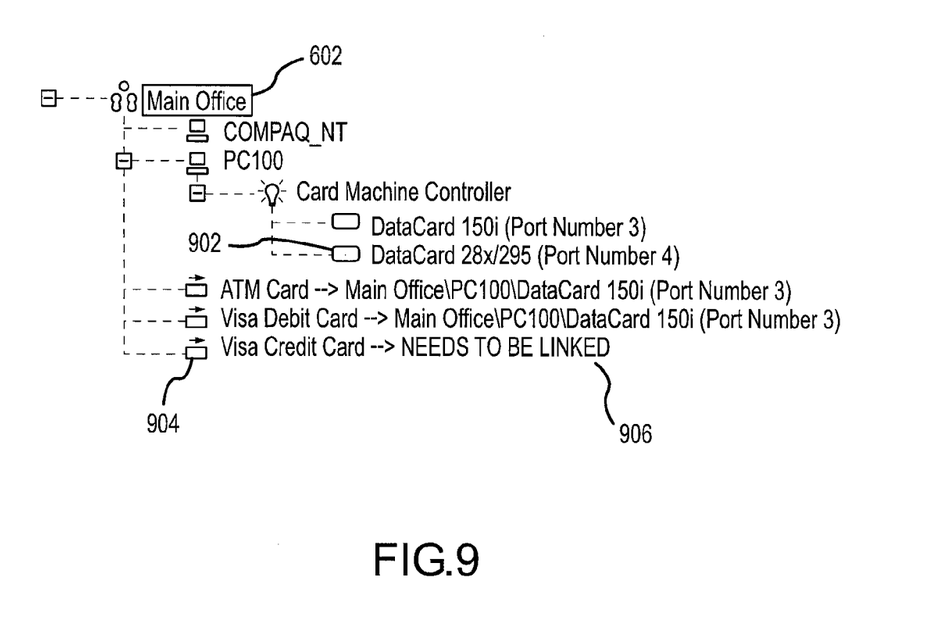
Figure 10:
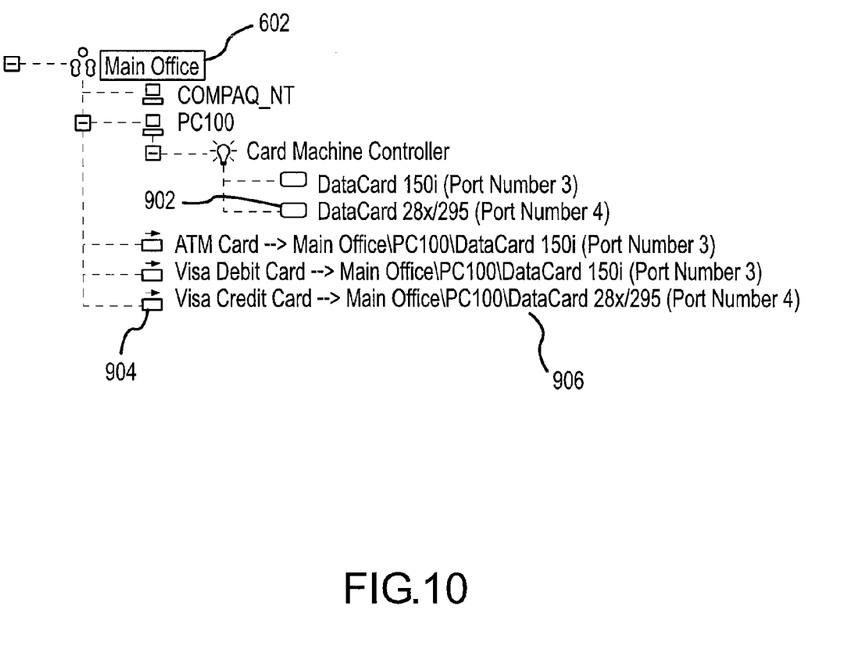

1. As shown in FIG. 6, right click on element 602 which defines a PC group named "Main Office".
2. A popup menu appears as shown in FIG. 7.
3. Click on the popup menu choice "New Card Format Link . . . " element 702 on FIG. 7.
4. A window appears as shown in FIG. 8.
5. Select the card format to create a link. In this example we select "Visa Credit Card", element 802 and then click on the OK button element 804.
6. The card format link appears in FIG. 9 as element 904 with a link definition 906 as "Needs to be linked".
7. The user clicks on the icon for the link, element 904, and drags the icon to the icon element 902 that represents the card issuance queue for a particular card issuance machine.
8. When the icon being dragged is released, the card format is linked to this queue as indicated by the link definition 1006 "Main Office\PC100\DataCard 28x/295)" in FIG. 10.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A method for producing identification cards of a plurality of card types using a plurality of card issuance machines that are located in a plurality of locations, wherein the card issuance machines are communicably coupled to an enterprise server through an enterprise network, the method comprising the steps of:
  generating a request in a client process to produce an identification card wherein said request includes information regarding a type of card to be produced from a plurality of card types;
  transmitting said request from said client process to the enterprise server through an enterprise network to manage the production of said identification card;
  evaluating a rule set and placing the request into one of a card issuance component queue where cards are ready for immediate production and a production queue for later production based on the evaluation, wherein the rule set includes card type criteria and geographic location criteria, and further comprising linking said request based at least in part on the requested card type and a geographic location where the request originated to one of the card issuance component queue and the production queue; and
  forwarding said request from said card issuance component queue to a card issuance controller process coupled to the plurality of card issuance machines for production of the identification card;
  producing the identification card using one of the card issuance machines.

2. The method of claim 1 wherein the production queue includes production requests for later processing, and further comprising;
  receiving instruction from an administrative user to process requests in said production queue; and
  transferring said request from said production queue to said card issuance component queue.

3. A method for producing identification cards using card issuance machines which are located at a variety of separate locations, the method comprising the steps of:

transmitting a request from a client computer system to an enterprise server system, wherein the request is to produce an identification card of a certain type from a plurality of card types;

at the enterprise server system, evaluating the request, including the card type and a geographic location where the request originated, to determine where and when the request to produce the identification card can be fulfilled, wherein the determination further includes evaluating a geographic location where card issuance machines are located and available for producing the identification card;

if the evaluation indicates that the card is ready for immediate production, placing the request into a card issuance type queue for immediate production of the card using one of the card issuance machines;

if the evaluation indicates that the card is not ready for immediate production, placing the request into a production type queue for later processing; and producing the card from the card issuance type queue or the production type queue using one of the card issuance machines.

* * * * *